(12) United States Patent
Martins

(10) Patent No.: US 7,652,862 B2
(45) Date of Patent: Jan. 26, 2010

(54) HARDWARE BASED OVER-CURRENT PROTECTION CIRCUITRY FOR POWER DISTRIBUTION SYSTEMS

(75) Inventor: Carlos E. Martins, Fremont, CA (US)

(73) Assignee: Avocent Huntsville Corporation, Huntsville, AL (US)

( * ) Notice: Subject to any disclaimer, the term of this patent is extended or adjusted under 35 U.S.C. 154(b) by 222 days.

(21) Appl. No.: 11/529,214

(22) Filed: Sep. 29, 2006

(65) Prior Publication Data

US 2008/0080115 A1    Apr. 3, 2008

(51) Int. Cl.
*H02H 3/00* (2006.01)
*H02H 3/08* (2006.01)

(52) U.S. Cl. .......................... 361/93.1; 361/62; 361/63; 361/64

(58) Field of Classification Search .............. 361/93.1, 361/62, 63, 64
See application file for complete search history.

(56) References Cited

U.S. PATENT DOCUMENTS

| | | | |
|---|---|---|---|
| 6,788,508 B2* | 9/2004 | Papallo et al. | 361/64 |
| 2002/0118500 A1* | 8/2002 | Covi et al. | 361/93.1 |
| 2004/0059903 A1* | 3/2004 | Smith et al. | 713/1 |
| 2005/0213273 A1* | 9/2005 | Wang | 361/90 |

* cited by examiner

*Primary Examiner*—Robert DeBeradinis
*Assistant Examiner*—Scott Bauer
(74) *Attorney, Agent, or Firm*—Davidson Berquist Jackson & Gowdey LLP

(57) ABSTRACT

A power distribution unit that switches off power outlets in the event of an over-current condition by using circuitry that measures how long input current has exceeded a threshold and sending a reset signal to the power outlets when input current has exceeded the threshold for a predetermined time duration.

7 Claims, 7 Drawing Sheets

US 7,652,862 B2

HARDWARE BASED OVER-CURRENT PROTECTION CIRCUITRY FOR POWER DISTRIBUTION SYSTEMS

FIELD OF THE INVENTION

This relates to a power distribution unit that selectively controls power outlets in the event of an over-current condition, and in one embodiment to circuitry that measures input current and resets the power outlets when an over-current condition occurs.

INTRODUCTION

Power distribution units provide a way to distribute power from a single input source to a plurality of power outlets. A typical use of a power distribution unit is powering a plurality of back racked servers through a single connection to a building's wiring system. Some power distribution units are intelligent power distribution units. That is, they can provide individual outlet control from a remote location through a network connection. When using a power distribution unit, it is important to insure that the current drawn by the power distribution unit is not too large such that an over-current condition is created. A large current can damage the power distribution unit or expensive equipment connected to the power distribution unit. Some power distribution units include circuitry to monitor the RMS current being drawn by the power distribution unit and use such circuitry to display the magnitude of the current on a display on the unit. Units that monitor the current being drawn can also activate a visual or audio alarm when the current goes over a user defined threshold. Further, monitored current information can be sent to a managing server.

Some prior art power distribution units contain no over-current protection circuitry and simply rely on the building's circuit breaker for over-current protection. Such prior art system are disadvantageous because a building with a faulty circuit breaker could damage the unit and if an over-current condition occurs and the building circuit breaker is tripped, other appliances within the building are likely to be powered down since multiple appliances are typically connected to the same circuit. Furthermore, when the circuit is tripped it must be reset by accessing the building's circuit breaker. The trip characteristics of typical circuit breakers are such that it generally takes several seconds or possible minutes for the breaker to actuate in the event the current is slightly over the threshold value.

Some prior art power distribution units include built-in over-current protection circuitry in the form of fuses or local thermal/magnetic circuit breakers. Built-in fuses are inconvenient due to the fact that they must be replaced every time an over-current condition occurs. Built-in circuit breakers add appreciable cost to the power distribution unit. Furthermore, prior art power distribution units with a built-in circuit breaker require that the breaker must be reset locally by accessing the power distribution unit when it is tripped. Further, when the over-current condition is determined by the physical properties of components, the over-current condition cannot be varied without physically removing or modifying the components. Thus, there is need for a way of providing extra protection for power distribution units which is neither inconvenient nor expensive.

The power distribution units described herein can utilize some of the circuits and components already present in the power distribution device such as current monitoring and relays, so as to provide a cheaper, convenient and reliable way to detect and reduce events associated with electrical over-current condition. Further, the power distribution units described herein may actuate faster than the branch circuit breaker thus avoid its triggering.

BRIEF DESCRIPTION OF THE DRAWINGS

The following description, given with respect to the attached drawings, may be better understood with reference to the non-limiting examples set forth with the drawings which are as follows.

DETAILED DESCRIPTION OF THE PRESENTLY PREFERRED EXEMPLARY EMBODIMENTS

Figure 1:
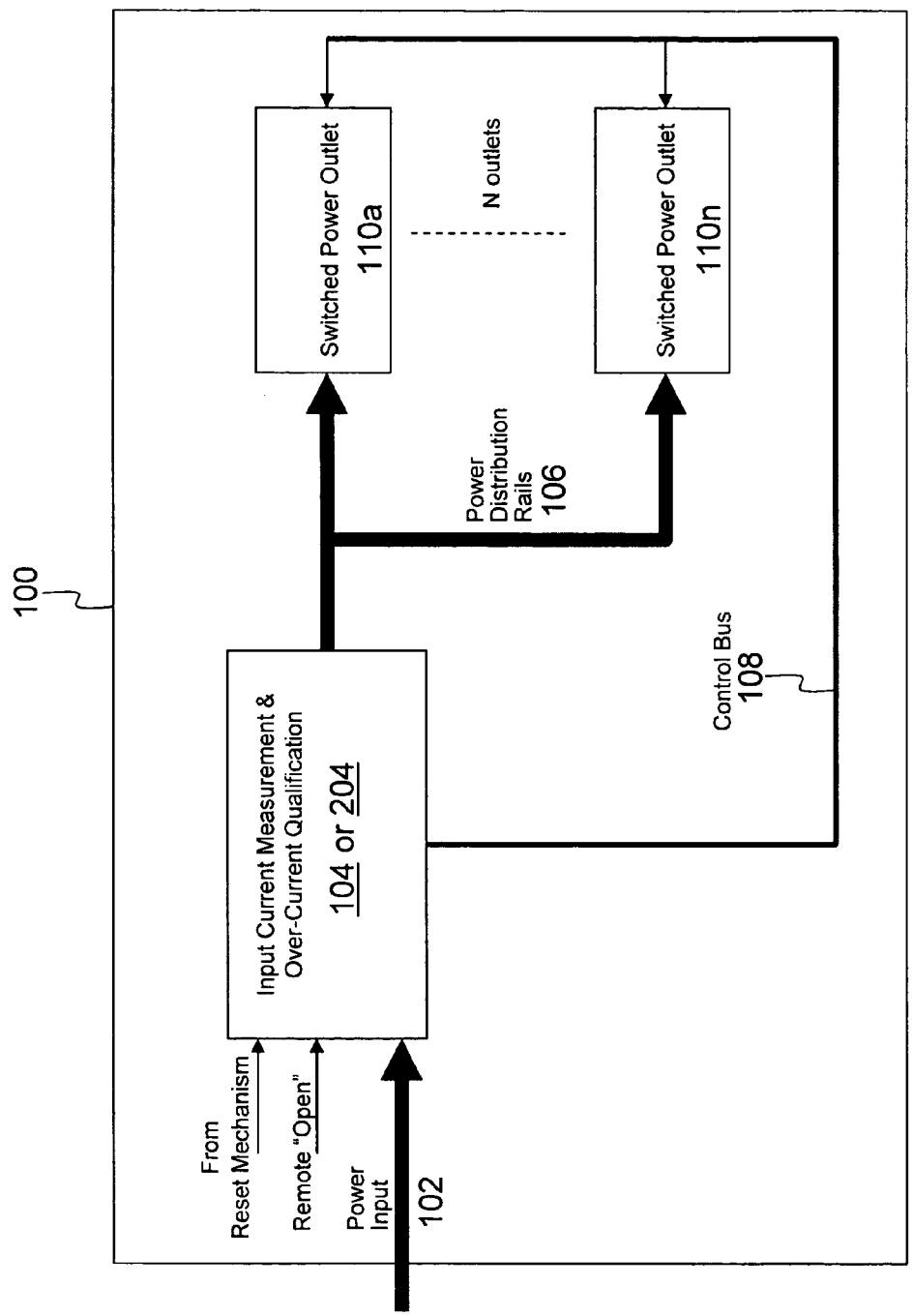
FIG. 1 is a block diagram of an exemplary power distribution unit that uses current monitoring to detect an over-current condition and disconnects power outlets.

FIG. 1 shows an exemplary embodiment of a power distribution unit that uses current monitoring to detect an over-current condition and disconnect outlets. Power distribution unit 100 receives power from a source at power input 102 and outputs power to a plurality of switched power outlets 110a-110n via power distribution rails 106. Power distribution unit 100 typically receives input power from an outlet connected to a building's wiring system. As such, power input 102 is a set of unterminated wires or the appropriate NEMA or IEC connector. Power input 102 can be configured to interface any appropriate connection. Input power can be either single phase power or multi-phase power. Power distribution unit 100 typically has 10 to 20 switched power outlets 110a-110n, but can include any number of switched power outlets 110a-110n.

Power distribution unit 100 comprises qualification circuitry 104 for measuring the current received from power input 102 and for sending an "Open" signal to power outlets 110a-110n via control bus 108. Power distribution unit 100 operates by comparing the current in each input phase and issuing at least one "Open" signal that will switch off a selected number of output power outlets 110a-110n when the over-current condition is detected. The system can be used in either single or multiple phase systems and the over-current qualification is based on the combination of two variables: current magnitude and time duration of the over-current condition (both parameters can be preset independently by setting appropriate component values). The number of power outlets that are opened can be from 1 to n.

Figure 2A:
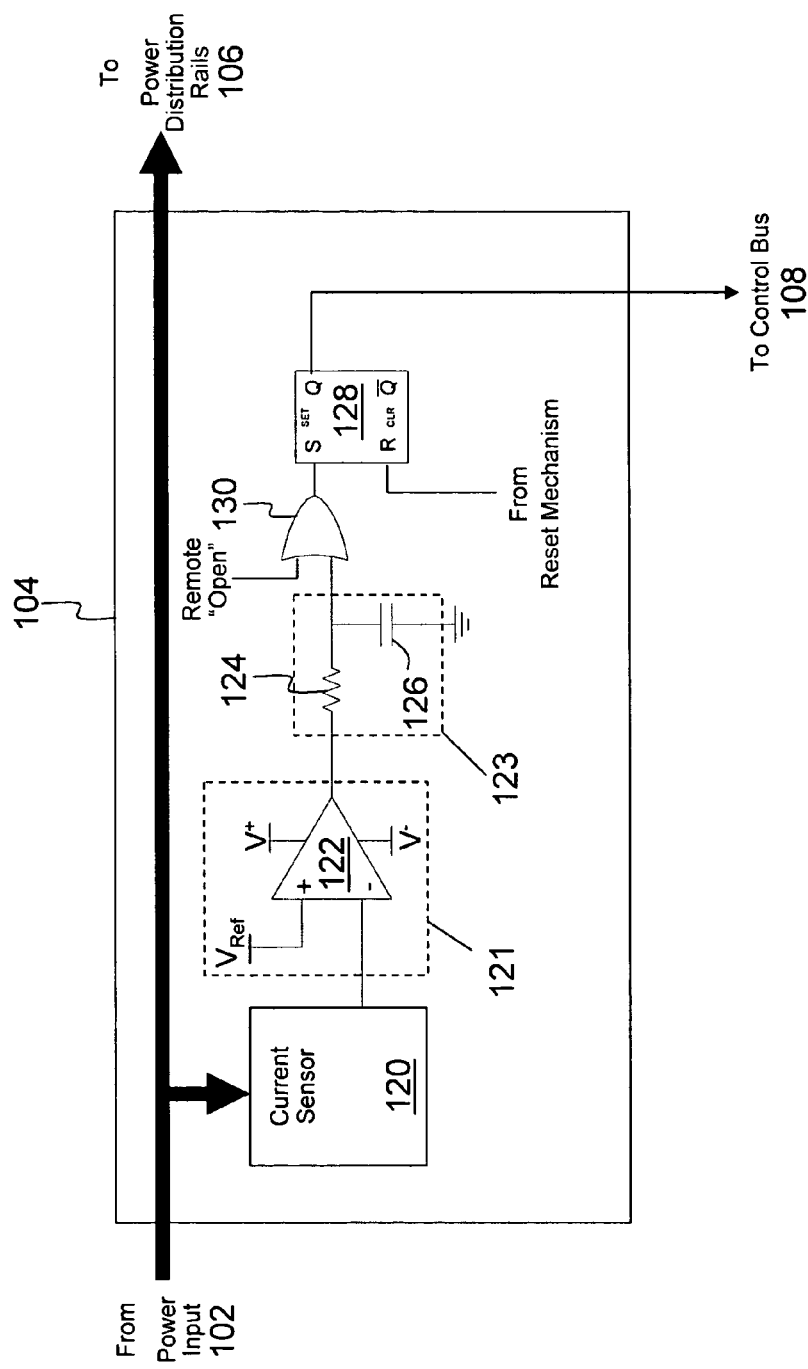
FIG. 2a is an exemplary embodiment of over-current measuring and qualification circuitry used in accordance with the power distribution unit of FIG. 1.

FIG. 2a shows a detailed view of one embodiment of qualification circuitry 104. Qualification circuitry 104 is used when power distribution unit 100 receives a single phase power input 102. Qualification circuitry 104 measures power input 102 at current sensor 120. Current sensor 120 provides a linear output proportional to the instant peak current. Current sensor 120 is typically a Hall-effect current sensor, but can be any type of sensor capable of providing a measurable value (e.g., voltage or resistance) that is a function of the instantaneous peak current. Hall-effect current sensors are advantageous because they allow current to be measured without interrupting power input. The output from current sensor 120 is received at comparator block 121. Comparator block 121 is shown as an operational amplifier 122 in a comparator configuration. Operational amplifier 122 outputs a signal when the output of current sensor 120 is greater than a reference voltage, $V_{Ref}$, as is known with comparator circuits. Thus, comparator block 121 only outputs a signal with a predetermined voltage when the instantaneous current from the power input 102 is above a given threshold, thereby providing the current magnitude threshold for the over-current condition. It should be noted that although comparator block 121 is shown as a particular comparator configuration alternative comparator circuits could also be used as would be appreciated by one of ordinary skill in the art. Further, the value of $V_{Ref}$ and thus the threshold current need not be fixed, that is the value of $V_{Ref}$ can be set and changed throughout the lifetime of power distribution unit 100. The source $V_{Ref}$ can be the output of a digital-to-analog converter. This way the value of $V_{Ref}$ can be stored digital form. This allows the value of $V_{Ref}$ and the thus the over current condition to be changed remotely.

The output of comparator block 121 is received at a time qualification circuit 123 shown as a simple RC circuit comprising resistor 124 and capacitor 126. Resistor 124 and capacitor 126 provide the time duration qualification for the over-current condition. As is known with RC circuits, the product of the values of resistor 124 and capacitor 126 determines how the voltage across capacitor 126 increases as a function of time for a constant voltage input to the RC branch. Thus, time qualification circuit 123 will output a given voltage higher than the voltage input to the time qualification circuit 123 only after the time qualification circuit 123 has received the input voltage for a given period of time. As such, a time duration qualification can be set. It should be noted that although time qualification circuit 123 is shown with a particular RC circuit configuration alternative RC circuit configurations could also be used as would be appreciated by one of ordinary skill in the art. The values of resistor 124 and capacitor 126 and thus the time duration value need not be fixed, that is the value of the time duration can be set and changed throughout the lifetime of power distribution unit 100. Furthermore, time qualification circuit 123, is not limited to being an RC circuit with discrete components. Time qualification circuit 123 could be any circuit capable outputting a voltage proportional to the amount of time it has been receiving an input voltage of a predetermined magnitude i.e. an ASIC with such functionality.

The output of time qualification circuit 123 is fed into OR gate 130. The output of OR gate 130 is input to register 128 which is shown as an SR type latch. As is known in the art, a SR type latch outputs a digital "1" at output Q after SR type latch receives a voltage that represents a digital "1" at S. Once a SR type latch receives a voltage that represents a digital "1" at S the SR type latch outputs a "1" at Q, until the latch is reset (i.e. R=1). Thus, in this case once register 128 receives a voltage of sufficient magnitude (determined by current magnitude and time duration of the over-current condition as described above) from time qualification circuit 123 register 128 outputs a "1" until register 128 is reset.

Output of register 128 is connected to control bus 108 which is connected to switched power outlets 110*a*-110*n*. Switched power outlets 110*a*-110*n* comprises appropriate relays such that a "0" at the output of register 128 closes switched power outlets 110*a*-110*n* and a "1" at the output of register 128 serves as an "Open" signal for the switched power outlets 110*a*-110*n* which opens the switched power outlets 110*a*-110*n* and prevents power from being supplied to devices connected to switched power outlets 110*a*-110*n*. Further, under normal operation, once switched power outlets 110*a*-110*n* are opened they will not be closed until register 128 is reset. Switched power outlets 110*a*-110*n* can include any appropriate type of relays or circuitry to achieve the functionality described above as would be appreciated by one of ordinary skill in the art.

Register 128 is reset by a reset mechanism (not shown). The reset mechanism simply sends a signal to the register 128 which serves to bring the register to its initial state and can be a momentary switch located on the power distribution unit 100, a signal received from a remote control or the like, or a signal received from a remote user via a network. Thus, in the event of an over-current condition power, distribution unit 100 can be reset without the need to physically access the unit. It should be noted that although register 128 is shown and described as a SR type latch such a description is not intended to be limiting and register 128 could include any register capable of storing an over-condition until it is reset. In addition to receiving output of time qualification circuit 123, OR gate 130 also receives a Remote "Open" signal. This way power outlets 110*a*-110*n* can be opened by a user even when an over-current condition does not occur. Remote "Open" signal typically comes from a remote terminal that is connected to power distribution unit 100 via a network. Remote "Open" can come from any number of sources as would be appreciated by one of ordinary skill in the art, e.g. remote control, a physical switch, etc.

Figure 2B:
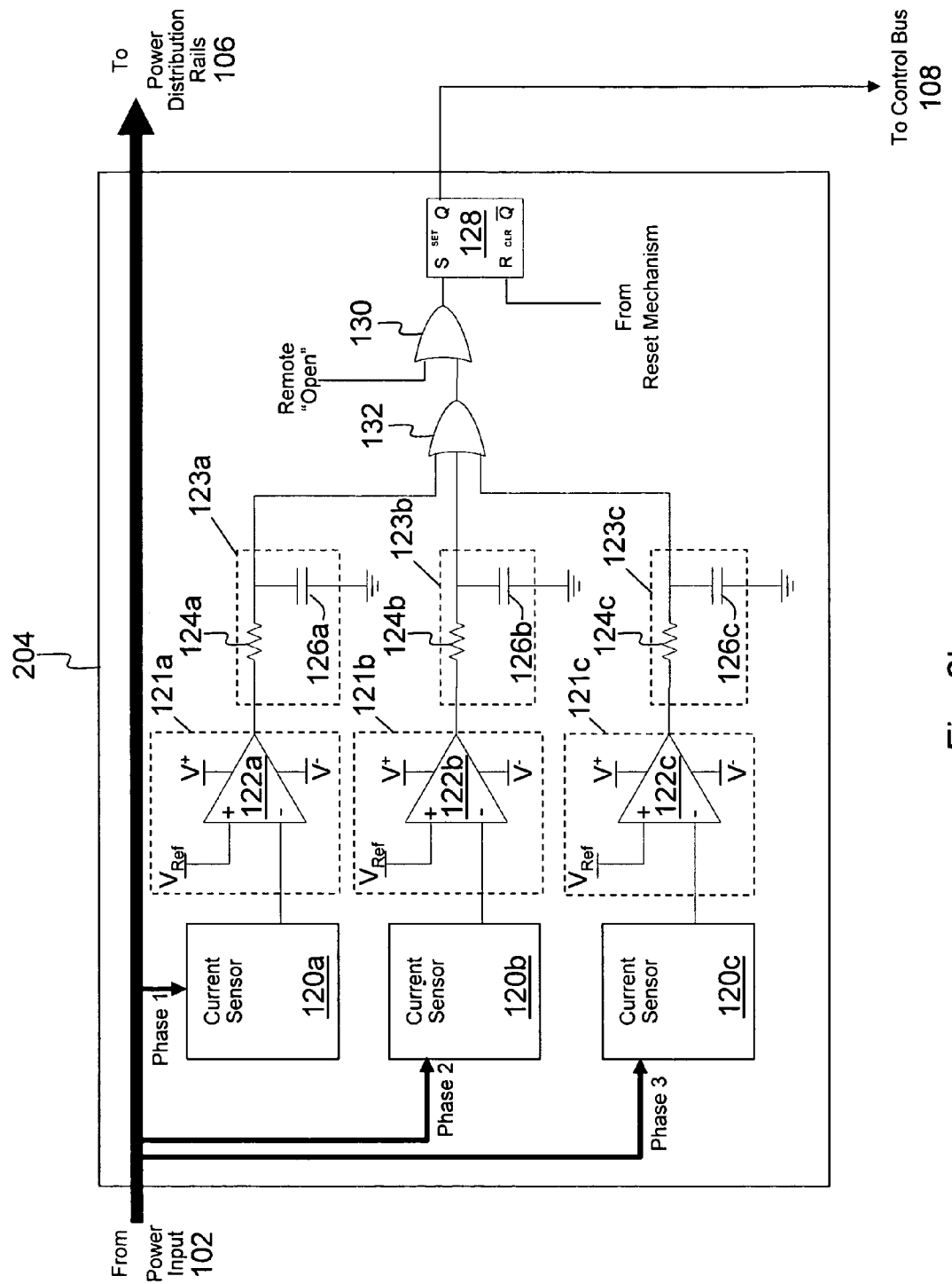
FIG. 2b is an alternative exemplary embodiment of over-current measuring and qualification circuitry used in accordance with the power distribution unit of FIG. 1.

FIG. 2*b* shows and alternative embodiment of qualification circuitry 104. Qualification circuitry 204 is similar to circuitry 104 except that circuitry 204 is designed to provide over-current protection for a three phase power system. As shown in FIG. 2*b*, power input 102 comprises three distinct branches each representing a respective power phase. Components in the qualification circuitry 204 with the same number as components in qualification circuitry 104 and with a suffix (a, b, or c) are similar to respective components in qualification circuitry 104 and for the sake of brevity will not be described herein. Reference is made to description of FIG. 2*a* for a description of such components. Qualification circuitry 204 includes an OR gate 132 that provides an input to OR gate 130 which serves to open the switched power outlets 111*a*-110*n* in the event that an over-current condition occurs for any of the three phase branches.

It should be noted that although qualification circuitry 104 and 204 are shown and described as distinct functional blocks comprising discrete components, such a description is for exemplary purposes only and is not intended to be limiting. Any subset of blocks and/or components can be integrated into a single ASIC as would be appreciated by one of ordinary skill in the art.

In a typical case where power distribution unit 100 is rated at 30 A, the current magnitude is set at 32 A and the time duration is set at 3.5 s for the over-current condition. This allows power distribution unit 100 to be opened within 3.5 s. In contrast, a typical circuit breaker with an over current condition of 30 A will take several seconds or maybe minutes to trigger under an over-current condition that is only 6.6% above the nominal (2/30×100%). Thus, under the above conditions, the protection on power distribution unit 100 provided by circuitry 104 will actuate prior to the protection provided by a typical branch circuit breaker.

Figure 3:
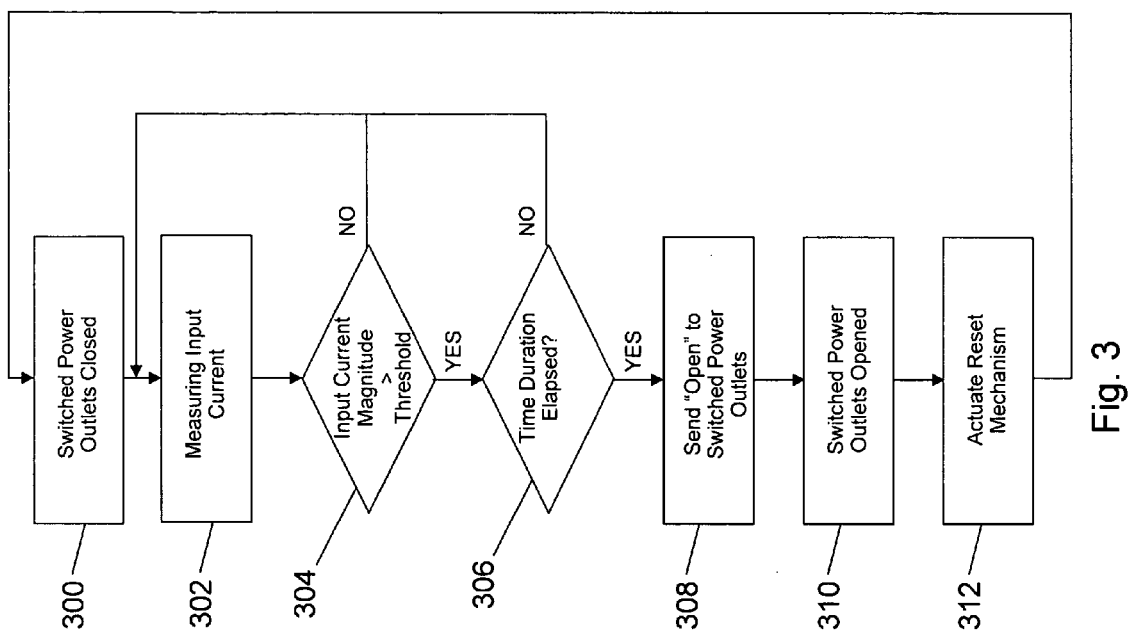
FIG. 3 is an flowchart illustrating the operation of the power distribution unit of FIG. 1.

FIG. 3 is a flow chart depicting the operation of power distribution unit 100. At step 300, the switched power outlets 110a-110n are closed (i.e., power distribution unit 100 is operating normally) and devices connected to power outlets 110a-110n are receiving power. At step 302, the input current is measured by current sensor 120 as described in accordance with FIG. 2a. At step 304, when the magnitude of the input current is above the threshold defined by comparator block 121 it is determined how long the magnitude of the instantaneous current has exceeded the threshold. At step 306, when the magnitude is above the threshold for the time duration set by time qualification block 123, an "Open" signal is sent to switched power outlets 110a-110n, at step 308. When the "Open" signal is sent to the switched power outlets 110a-110n, the switched power outlets 110a-110n are opened at step 310, and the devices connected to them no longer receive power. Once switched power outlets 110a-110n are opened, the power distribution unit 100 must be reset by the reset mechanism before normal operation resumes at step 300.

Figure 4:
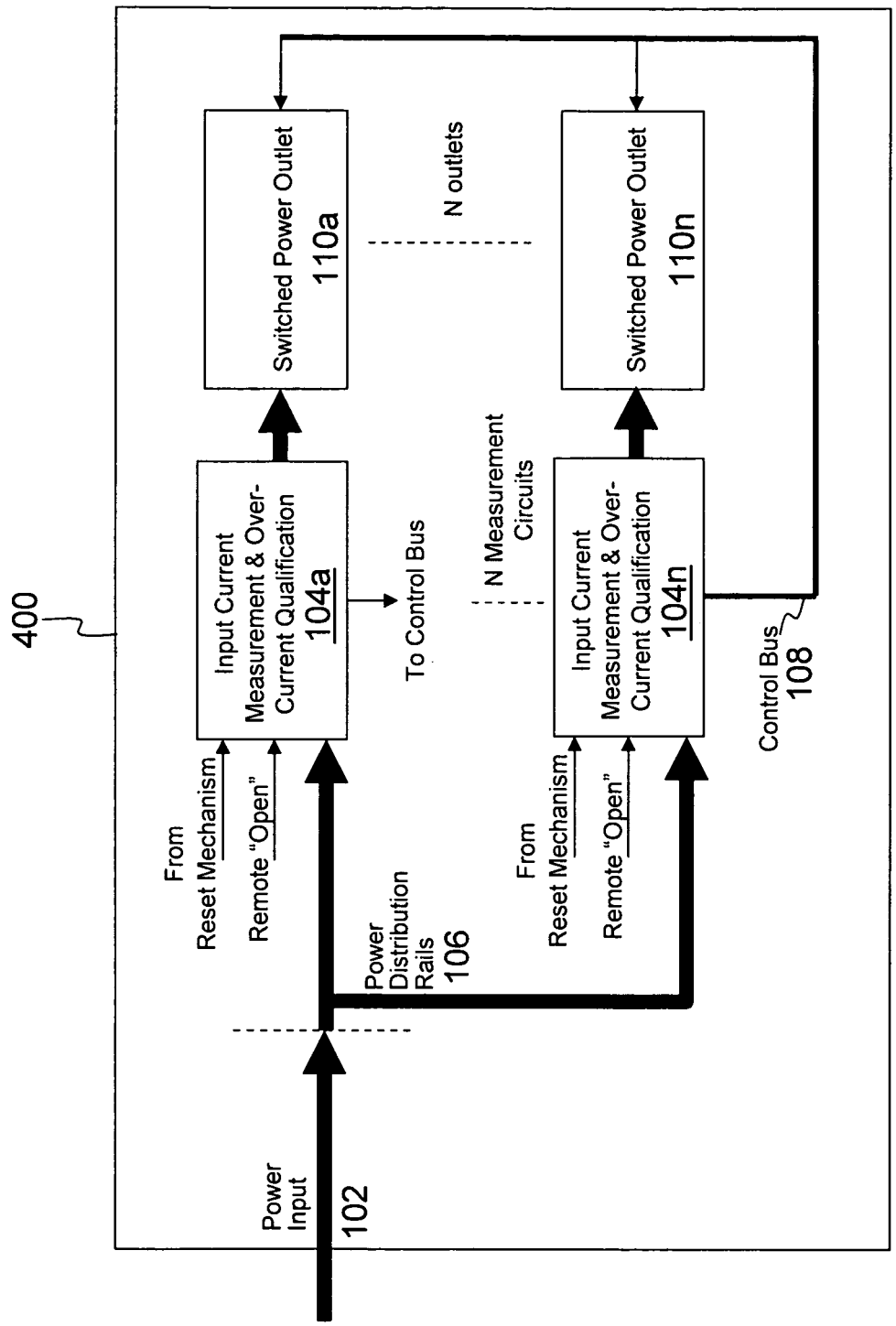
FIG. 4 is a block diagram of an alternative exemplary power distribution unit that uses current monitoring to detect an over-current condition and disconnects power outlets.

FIG. 4 shows an alternative embodiment of a power distribution unit. Power distribution unit 400 differs from power unit 100 in that each switched power outlet 110a-110n has respective qualification circuitry 104a-104n. Qualification circuitry 104a-104n is similar to qualification circuitry 104 when signal phase power is employed and qualification circuitry 204 when three-phase power is employed and for the sake of brevity will not be described herein. Reference is made to description of qualification circuitry 104 and 204. By having respective qualification circuitry for each outlet an over-current condition can be detected on an outlet-by-outlet basis, so that a single switched outlet can be switched off in the event that there is an over-current condition on that particular outlet. Power distribution unit 400 has the advantage of not requiring that all devices connected to it stop receiving power when an over current condition exists for a single switched outlet. It should be noted that although qualification circuitry 104a-104n is shown as a discrete blocks, such a representation is not intended to be limiting. Qualification circuitry 104a-104n can be integrated into any combination of subsets where there is a respective power distribution rail input and control bus output for each switched power outlet 110a-110n. It should also be noted that each of qualification circuitry can have different over-current conditions thereby giving each switched power outlet a different power rating.

Figure 5:
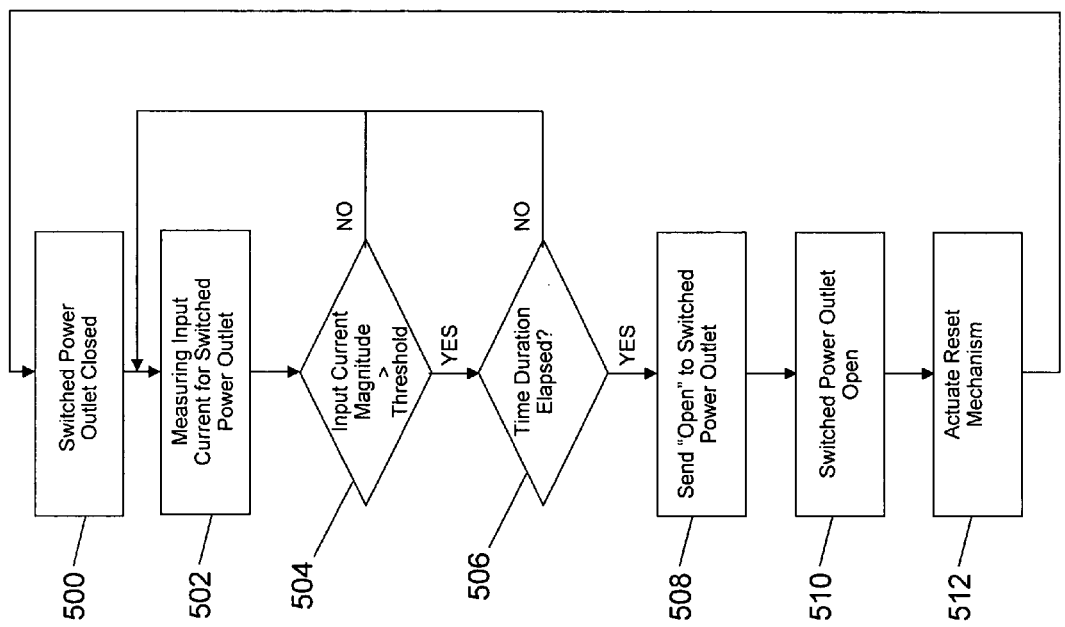
FIG. 5 is a flowchart illustrating the operation of the power distribution unit of FIG. 4.

FIG. 5 is a flow chart depicting the operation of qualification 104a-104n for each individual power outlet 110a-110n. At step 500, the individual switched power outlet 110n is closed (i.e., switched power outlet 110n is operating normally) and devices connected thereto are receiving power. At step 502, the instantaneous current of the power being drawn by the switched power outlet 110i is measured. At step 504, when the magnitude of the input current is exceeds the predetermined threshold, it is determined how long the magnitude of the instantaneous current has exceeded the threshold. At step 506, when the magnitude is above the threshold for a predetermined time duration, an "Open" signal is sent to the switched power outlet, at step 508. When the "Open" signal is sent to the switched power outlet 110i, the switched power outlet 110i is opened at step 510, i.e. the devices connected to it no longer receive power. Once switched power outlet 110i is opened, it must be reset the specified reset mechanism before normal operation resumes at step 500. The reset mechanism can be a momentary switch located on the power distribution unit 100, a signal received from a remote control or the like or a signal received from a remote user via a network.

It should be appreciated that although power distribution unit 100 may use qualification circuitry 104 for all of the switched power outlets 110a-110n and power distribution unit 400 may use qualification circuitry 104a-104n for respective switched power outlets 110a-110n, it is possible to use any number of qualification circuits between one and the number of switched outlets where the outlets can be controlled by the qualification circuitry blocks in any number of ways. For example, when there are 20 switched outlets it is possible to use two qualification circuits where half the switched outlets are controlled by one circuit and the other half are controlled by the other circuit. A particularly useful configuration is when switched power outlets with higher power ratings are controlled by a qualification circuit with a relatively high over-current condition and switched power outlets with lower power ratings are controlled by a qualification circuit with a relatively low over-current condition, where the relative value of the over-current condition refers to the ratio of current magnitude to time duration.

It should also be appreciated that when multiple qualification circuits are employed, each qualification circuit can output unique "Open" signals. This way all qualification circuits can be connected to a single communication line that is connected to power outlets 110a-110n and messages can be broadcast to all power outlets 110a-110n where each power outlet is capable of interpreting the message and responding (e.g. remaining closed or opening) accordingly.

Figure 6:
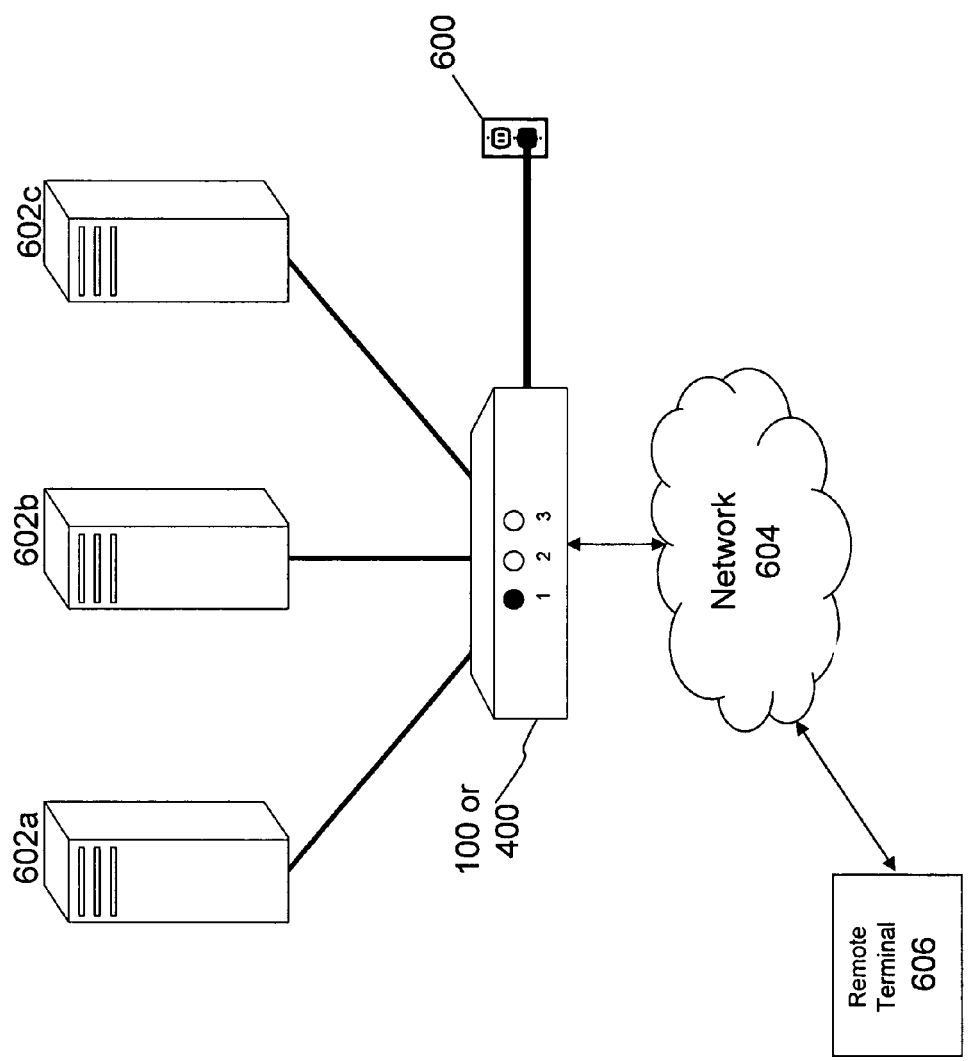
FIG. 6 shows an exemplary application for an exemplary power distribution unit.

FIG. 6 shows power distribution unit 100 or 400 in an exemplary use. As shown power distribution unit 100 draws power from a building power outlet 600 and distributes power to devices 602a, 602b, and 602c. Power distribution unit 100 is also connected to network 604, which is typically the internet or a LAN. A user at remote terminal 606 can control power distribution unit 100 via a user interface. Control functionality can include individual power outlet control as well as resetting power distribution unit 100 after an over-current condition occurs.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A power distribution unit for powering a plurality of servers from a single power input, comprising:
    a network interface to communicate with a remote terminal;
    a plurality of switched power outlets adapted and constructed to respectively provide power to corresponding ones of the plurality of servers;
    power distribution rails coupled to the plurality of switched power outlets;
    an over-current measurement and qualification circuit, comprising:
        a current sensor to measure a generally instantaneous magnitude of current from the single power input;
        a comparator to determine whether the generally instantaneous magnitude of current exceeds a magnitude threshold;
        a time qualification circuit to determine, when the generally instantaneous magnitude of current exceeds the threshold, a duration in which the generally instantaneous magnitude of current exceeded the magnitude threshold;

an OR gate having first and second inputs and a first output, the first OR gate input receiving a indicator signal indicating that the duration determined by the time qualification circuit exceeded a predetermined time amount, the second OR gate input connected to receive a REMOTE OPEN signal through the network interface from the remote terminal; and the first OR gate output outputting an OPEN COMMAND signal when either the indicator signal is received at the first OR gate or the REMOTE OPEN signal is received at the second OR gate; and a control bus carrying a control signal to signal certain ones of the plurality of switched power outlets to disconnect from the single power input, the certain ones being collectively a number related mathematically to an amount by which the generally instantaneous magnitude of current exceeded the magnitude threshold and the duration in which the generally instantaneous magnitude of current exceeded the magnitude threshold exceeded the predetermined time amount; and a register having first and second inputs and a first output, the first register input responding to the OPEN COMMAND signal, the second input register input responding to a RESET signal to reset the register received through the network interface from the remote terminal, and the first register output outputting the control signal.

2. A power distribution unit according to claim 1, wherein the time qualification circuit is an R-C circuit.

3. A power distribution unit according to claim 1, wherein, when a switched power outlet is commanded to disconnect from the single power input, it can only be closed again by issuance of the RESET signal.

4. A power distribution unit for powering a plurality of servers from a single power input, comprising:

a network interface to communicate with a remote terminal;

a plurality of switched power outlets adapted and constructed to respectively provide power to corresponding ones of the plurality of servers;

a plurality of power distribution rails collectively receiving power from the single power input;

a plurality of over-current measurement and qualification circuits respectively connected between corresponding ones of the plurality of power distribution rails to receive power from the single power and corresponding ones of the plurality of switched power outlets, each comprising:

a current sensor to measure a generally instantaneous magnitude of current from a corresponding power distribution rail;

a comparator to determine whether the generally instantaneous magnitude of current exceeds a magnitude threshold;

a time qualification circuit to determine, when the generally instantaneous magnitude of current exceeds the threshold, a duration in which the generally instantaneous magnitude of current exceeded the magnitude threshold;

an OR gate having first and second inputs and a first output,
  the first OR gate input receiving a indicator signal indicating that the duration determined by the time qualification circuit exceeded a predetermined time amount;
  the second OR gate input connected to receive a REMOTE OPEN signal through the network interface from the remote terminal; and
  the first OR gate output outputting an OPEN COMMAND signal when either the indicator signal is received at the first OR gate or the REMOTE OPEN signal is received at the second OR gate; and a register having first and second inputs and a first output, the first register input responding to the OPEN COMMAND signal, the second input register input responding to a RESET signal to reset the register received through the network interface from the remote terminal, and the first register output outputting a control signal to signal a corresponding certain ones of the plurality of switched power outlets to open-circuit between a corresponding one of the plurality of switched power outlets and the corresponding power distribution rail; and the power distribution unit further comprising a control bus carrying each control signal from each register commanding a calculated number of registers to open-circuit the same calculated number of switched power outlets, the calculated number being related to an amount of over-current measured, collectively, by all of the plurality of over-current measurement and qualification circuits.

5. A power distribution unit according to claim 4, wherein the time qualification circuit is an R-C circuit.

6. A power distribution unit according to claim 4, wherein the register is an S-R flip-flop.

7. A power distribution unit according to claim 4, wherein, when a switched power outlet is commanded to open-circuit, it can only be closed again by issuance of the corresponding RESET signal.

* * * * *